United States Patent
Duranleau-Hendrickx

(10) Patent No.: US 12,215,590 B2
(45) Date of Patent: Feb. 4, 2025

(54) METHOD FOR CHECKING BLEED-OFF VALVE CLOSING POINT

(71) Applicant: Pratt & Whitney Canada Corp., Longueuil (CA)

(72) Inventor: Louis Duranleau-Hendrickx, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 192 days.

(21) Appl. No.: 17/828,837

(22) Filed: May 31, 2022

(65) Prior Publication Data
US 2023/0383673 A1    Nov. 30, 2023

(51) Int. Cl.
F01D 21/00    (2006.01)
F02C 9/18    (2006.01)
F04D 27/02    (2006.01)

(52) U.S. Cl.
CPC .......... F01D 21/003 (2013.01); F02C 9/18 (2013.01); F04D 27/0207 (2013.01); F05D 2260/606 (2013.01); F05D 2260/83 (2013.01)

(58) Field of Classification Search
CPC ...... F01D 21/003; F02C 9/18; F04D 27/0207; F05D 2260/606; F05D 2260/83; F05D 2220/32; F05D 2220/76; F05D 2270/335; F16K 37/0075; F16K 37/00; G01M 15/14
See application file for complete search history.

(56) References Cited

U.S. PATENT DOCUMENTS

| | | | | |
|---|---|---|---|---|
| 4,683,715 A | * | 8/1987 | Iizuka | F02C 9/18 60/778 |
| 5,313,778 A | * | 5/1994 | Sweet | F02C 9/18 60/772 |
| 6,141,951 A | | 11/2000 | Krukoski | |
| 9,068,463 B2 | | 6/2015 | Pandey | |
| 11,047,313 B2 | | 6/2021 | Burge | |
| 2010/0083667 A1 | * | 4/2010 | Franconi | G05D 7/014 251/28 |
| 2017/0321570 A1 | | 11/2017 | Scothern | |
| 2019/0264701 A1 | * | 8/2019 | Rowe | F04D 27/02 |
| 2021/0270190 A1 | | 9/2021 | Duranleau-Hendrickx | |

OTHER PUBLICATIONS

EP search report for EP23176539.7 dated Oct. 24, 2023.

* cited by examiner

*Primary Examiner* — Todd E Manahan
*Assistant Examiner* — Rodolphe Andre Chabreyrie
(74) *Attorney, Agent, or Firm* — Getz Balich LLC

(57) ABSTRACT

A method for checking a closing point for a bleed-off valve for a gas turbine engine includes determining a modulation characteristic curve for the bleed-off valve, determining a nominal closing point value for the bleed-off valve on the modulation characteristic curve, operating the gas turbine engine and increasing an engine power of the gas turbine engine until the gas turbine engine parameter reaches a predetermined testing value, and determining a bleed-off valve measured value and a gas turbine engine measured value when the gas turbine engine parameter reaches the predetermined testing value. The gas turbine engine measured value is different than the nominal closing point value. The method further includes determining an extrapolated closing point value and checking the closing point for the bleed-off valve by comparing the bleed-off valve measured value or the gas turbine engine measured value to the extrapolated closing point value.

14 Claims, 10 Drawing Sheets

METHOD FOR CHECKING BLEED-OFF VALVE CLOSING POINT

TECHNICAL FIELD

This disclosure relates generally to bleed gas systems for gas turbine engines and, more particularly, to methods for checking bleed gas system operation.

BACKGROUND OF THE ART

Gas turbine engines, such as those used for aircraft propulsion, may include bleed gas systems configured to regulate fluid pressure in one or more fluid systems. A bleed-off system may be used to regulate fluid pressure within a compressor of a gas turbine engine, for example, to protect the gas turbine engine against aerodynamic instabilities (e.g., surge or stall). Proper operation of bleed gas systems may facilitate efficient operation of the associated gas turbine engine. Various systems and methods are known in the art for verifying proper operation of bleed gas systems. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a method for checking a closing point for a bleed-off valve for a gas turbine engine includes determining a modulation characteristic curve for the bleed-off valve. The modulation characteristic curve is a function of a bleed-off valve parameter and a gas turbine engine parameter. The method further includes determining a nominal closing point value for the bleed-off valve on the modulation characteristic curve. The nominal closing point value is a value of the gas turbine engine parameter. The method further includes operating the gas turbine engine and increasing an engine power of the gas turbine engine until the gas turbine engine parameter reaches a predetermined testing value and determining a bleed-off valve measured value of the bleed-off valve parameter and a gas turbine engine measured value of the gas turbine engine parameter when the gas turbine engine parameter reaches the predetermined testing value. The gas turbine engine measured value is different than the nominal closing point value. The method further includes determining, using the modulation characteristic curve, an extrapolated closing point value of: the bleed-off valve parameter based on the gas turbine engine measured value, or the gas turbine engine parameter based on the bleed-off valve measured value. The method further includes checking the closing point for the bleed-off valve by comparing the bleed-off valve measured value or the gas turbine engine measured value to the extrapolated closing point value, where the extrapolated closing point value is a value of the bleed-off valve parameter or the gas turbine engine parameter, respectively.

In any of the aspects or embodiments described above and herein, the step of determining the extrapolated closing point value may include determining the extrapolated closing point value of the bleed-off valve parameter based on the gas turbine engine measured value. The step of checking the closing point may include comparing the bleed-off valve measured value to the extrapolated closing point value.

In any of the aspects or embodiments described above and herein, the step of determining the extrapolated closing point value may include determining the extrapolated closing point value of the gas turbine engine parameter based on the bleed-off valve measured value. The step of checking the closing point may include comparing the gas turbine engine measured value to the extrapolated closing point value.

In any of the aspects or embodiments described above and herein, the step of determining the modulation characteristic curve may include determining an altitude and an inlet air temperature for the gas turbine engine. The modulation characteristic curve may be based, at least in part, on the altitude and the inlet air temperature.

In any of the aspects or embodiments described above and herein, the bleed-off valve parameter may be a bleed-off valve outlet pressure.

In any of the aspects or embodiments described above and herein, the gas turbine engine parameter may be an engine speed of the gas turbine engine.

In any of the aspects or embodiments described above and herein, the predetermined testing value may be an engine operating limit for the gas turbine engine.

In any of the aspects or embodiments described above and herein, the nominal closing point value may be outside of the engine operating limit for the gas turbine engine.

In any of the aspects or embodiments described above and herein, the predetermined testing value may be a non-limiting value.

In any of the aspects or embodiments described above and herein, the method may further include adjusting the closing point for the bleed-off valve if the respective bleed-off valve measured value or gas turbine engine measured value is outside of a predetermined tolerance range of the extrapolated closing point value.

In any of the aspects or embodiments described above and herein, the gas turbine engine may include a compressor section which defines a portion of a core flow path through the gas turbine engine. The bleed-off valve may be in fluid communication with the core flow path within the compressor section via a pressure relief line. The step of operating the gas turbine engine may include regulating a pressure of core gas within the compressor section by bleeding core gas from the core flow path with the bleed-off valve.

In any of the aspects or embodiments described above and herein, the bleed-off valve may be in fluid communication with the core flow path within an intermediate stage of a compressor of the compressor section.

According to another aspect of the present disclosure, a method for checking a closing point for a bleed-off valve for a gas turbine engine includes determining a modulation characteristic curve for the bleed-off valve. The modulation characteristic curve is a function of a bleed-off valve outlet pressure of the bleed-off valve and an engine speed of the gas turbine engine. The method further includes operating the gas turbine engine and increasing an engine power of the gas turbine engine until the engine speed reaches a predetermined testing value, determining a bleed-off valve measured value of the bleed-off valve outlet pressure and a gas turbine engine measured value of the engine speed when the engine speed reaches the predetermined testing value, and determining an extrapolated closing point value of the engine speed based on the bleed-off valve outlet pressure. The extrapolated closing point value corresponds to the engine speed of the modulation characteristic curve at the bleed-off valve measured value of the bleed-off valve outlet pressure. The method further includes checking the closing point for the bleed-off valve by comparing the gas turbine engine measured value to a predetermined tolerance range of the extrapolated closing point value.

In any of the aspects or embodiments described above and herein, the step of determining the modulation characteristic curve may include determining an altitude and an inlet air temperature for the gas turbine engine. The modulation characteristic curve may be based, at least in part, on the altitude and the inlet air temperature.

In any of the aspects or embodiments described above and herein, the method may further include adjusting the closing point for the bleed-off valve if the gas turbine engine measured value is outside of the predetermined tolerance range of the extrapolated closing point value.

In any of the aspects or embodiments described above and herein, the method may further include determining a nominal closing point value for the bleed-off valve on the modulation characteristic curve. The nominal closing point value may be a value of the engine speed. The gas turbine engine measured value may be less than the nominal closing point value.

According to another aspect of the present disclosure, a method for checking a closing point for a bleed-off valve for a gas turbine engine includes determining a modulation characteristic curve for the bleed-off valve. The modulation characteristic curve is a function of a bleed-off valve outlet pressure of the bleed-off valve and an engine speed of the gas turbine engine. The method further includes operating the gas turbine engine and increasing an engine power of the gas turbine engine until the engine speed reaches a predetermined testing value, determining a bleed-off valve measured value of the bleed-off valve outlet pressure and a gas turbine engine measured value of the engine speed when the engine speed reaches the predetermined testing value, and determining an extrapolated closing point value of the bleed-off valve outlet pressure based on the engine speed. The extrapolated closing point value corresponds to the bleed-off valve outlet pressure of the modulation characteristic curve at the gas turbine engine measured value of the engine speed. The method further includes checking the closing point for the bleed-off valve by comparing the bleed-off valve measured value to a predetermined tolerance range of the extrapolated closing point value the extrapolated closing point value.

In any of the aspects or embodiments described above and herein, the step of determining the modulation characteristic curve may include determining an altitude and an inlet air temperature for the gas turbine engine. The modulation characteristic curve may be based, at least in part, on the altitude and the inlet air temperature.

In any of the aspects or embodiments described above and herein, the method may further include adjusting the closing point for the bleed-off valve if the bleed-off valve measured value is outside of the predetermined tolerance range of the extrapolated closing point value.

In any of the aspects or embodiments described above and herein, the method may further include determining a nominal closing point value for the bleed-off valve on the modulation characteristic curve. The nominal closing point value may be a value of the engine speed. The gas turbine engine measured value may be less than the nominal closing point value.

According to another aspect of the present disclosure, a method for checking a closing point for a bleed-off valve for a gas turbine engine includes determining a modulation characteristic curve for the bleed-off valve. The modulation characteristic curve is a function of a bleed-off valve outlet pressure of the bleed-off valve and an engine speed of the gas turbine engine. The method further includes determining a nominal closing point value for the bleed-off valve on the modulation characteristic curve. The nominal closing point value is a value of the engine speed. The method further includes operating the gas turbine engine and increasing an engine power of the gas turbine engine until the engine speed reaches a predetermined testing value, determining a bleed-off valve measured value of the bleed-off valve outlet pressure and a gas turbine engine measured value of the engine speed when the engine speed reaches the predetermined testing value, determining an extrapolated closing point value of the engine speed based a slope of the modulation characteristic curve between the predetermined testing value and the nominal closing point value, and checking the closing point for the bleed-off valve by comparing the gas turbine engine measured value to a predetermined tolerance range of the nominal closing point value.

The present disclosure, and all its aspects, embodiments and advantages associated therewith will become more readily apparent in view of the detailed description provided below, including the accompanying drawings.

DETAILED DESCRIPTION

Figure 1:
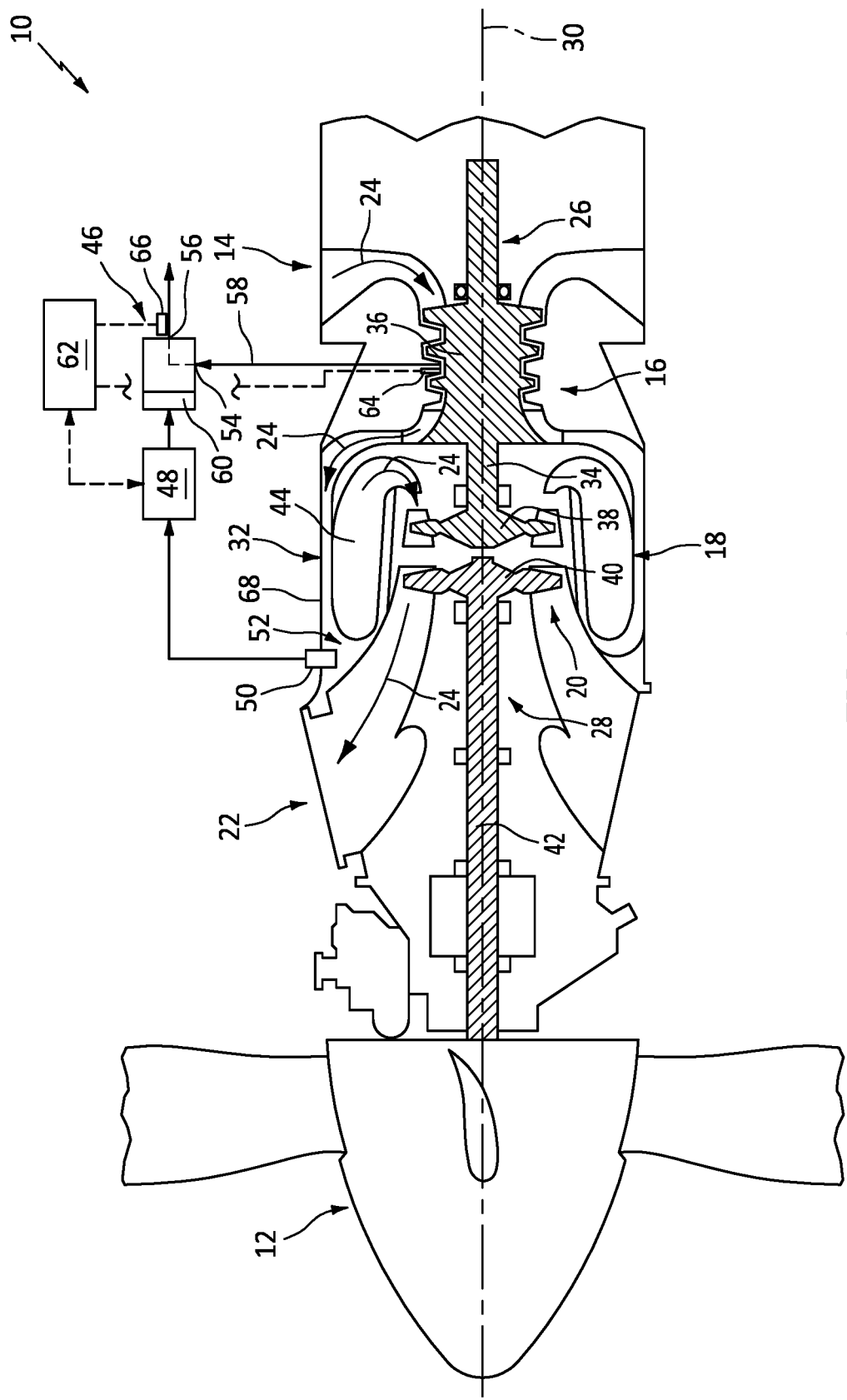
FIG. 1 illustrates a schematic view of a gas turbine engine, in accordance with one or more embodiments of the present disclosure.

FIG. 1 schematically illustrates a gas turbine engine 10. The gas turbine engine 10 of FIG. 1 is a multi-spool turboprop engine. However, while the following description and accompanying drawings refer to a turboprop engine as an example, it should be understood that aspects of the present disclosure may be equally applicable to other types of gas turbine engines including, but not limited to, a turboshaft gas turbine engine, a turbofan gas turbine engine, or a turbojet gas turbine engine. The gas turbine engine 10 of FIG. 1 is configured to drive (e.g., apply a rotational force to) a propeller 12. This gas turbine engine 10 includes an air inlet 14, a compressor section 16, a combustor section 18, a turbine section 20, and an exhaust outlet 22. The compressor section 16 drives air from the air inlet 14 along a core flow path 24 for compression and communication into the combustor section 18 and then expansion through the turbine section 20.

The gas turbine engine 10 of FIG. 1 includes a first rotational assembly 26 (e.g., a high-pressure spool), a second rotational assembly 28 (e.g., a low-pressure spool), an engine static structure 30 (e.g., an engine case), and an annular combustor 32. The first rotational assembly 26 and the second rotational assembly 28 are mounted for rotation about an axial centerline 34 (e.g., a rotational axis) of the gas turbine engine 10 relative to the engine static structure 30. The first rotational assembly 26 includes a first shaft 36, a first compressor 38, and a first turbine 40. The first shaft 36 interconnects the first compressor 38 and the first turbine 40. The second rotational assembly 28 includes a second shaft 42 and a second turbine 44. The second turbine 44 is connected to the second shaft 42. It should be understood that "low pressure" and "high pressure" or variations thereof as used herein are relative terms indicating that the high pressure is greater than the low pressure. The annular combustor 32 is disposed between the first compressor 38 and the first turbine 40 along the core flow path 24. In operation, airflow along the core flow path 24 is compressed by the first compressor 38, mixed and burned with fuel in the combustor 32, and then expanded through the first turbine 40 and the second turbine 44. The first turbine 40 and the second turbine 44 rotationally drive the first rotational assembly 26 and the second rotational assembly 28, respectively, in response to the expansion of the combustion gases. The combustion gases may then exit the gas turbine engine 10 via the exhaust outlet 22.

The first rotational assembly 26 and the second rotational assembly 28 of FIG. 1 are mechanically independent of one another so that they may rotate at different speeds and/or in opposite directions. The air flow through the gas turbine engine 10 of FIG. 1 along the core flow path 24 is directed in an aft-to-forward direction, where the air inlet 14 may be disposed in a portion of the gas turbine engine 10 which is aft of the combustor 32 and the exhaust outlet 22 may be disposed in a portion of the gas turbine engine 10 which is forward of combustor 32.

The gas turbine engine 10 of FIG. 1 includes a bleed-off valve 46 (BOV), a pilot valve 48, and an intake device 50. The intake device 50 may be in fluid communication with a pressurized gas cavity 52 of the gas turbine engine 10. The intake device 50 may be fluidly coupled to the pilot valve 48. The pilot valve 48 may be fluidly coupled to the bleed-off valve 46 (e.g., to a pneumatic actuator of the bleed-off valve 46).

The bleed-off valve 46 includes an inlet 54 and an outlet 56. The inlet 54 of the bleed-off valve 46 is in fluid communication with the core flow path 24 within the compressor section 16. For example, the inlet 54 of the bleed-off valve 46 of FIG. 1 is fluidly coupled with an intermediate stage of the first compressor 38 by a pressure relief line 58. The bleed-off valve 46 is configured to control (e.g., regulate) core gas flow along the core flow path 24 by selectively releasing core gas from the core flow path 24 based on operating conditions of the gas turbine engine 10. The bleed-off valve 46 of FIG. 1 may provide surge margin control for the first compressor 38 by regulating gas pressure within the intermediate stage of the first compressor 38. Core gas released from the outlet 56 of the bleed-off valve 46 may be directed to the surrounding atmosphere, may be redirected to one or more upstream (e.g., lower pressure) locations or stages of a compressor (e.g., the first compressor 38), and/or may be used by one or more pressurized bleed gas loads of the gas turbine engine 10 or associated aircraft. Examples of pressurized bleed gas loads may include, but are not limited to, aircraft environmental control systems (ECS), de-icing systems, pneumatic systems, and the like.

The bleed-off valve 46 may include or otherwise be in operable communication with a pneumatic actuator 60. The pneumatic actuator 60 may be operated by pressurized gas to selectively position the bleed-off valve 46 in a closed position, an open position, and a plurality of intermediate positions between the closed position and the open position, to control the release of the core gas from the core flow path 24. As used herein, the term "closed position" refers to a position of greatest flow restriction of the bleed-off valve 46 for pressurized gas between the inlet 54 and the outlet 56, such that there is no flow or substantially no flow of pressurized gas from the inlet 54 to the outlet 56. The bleed-off valve 46 may be opened at a relatively low rotational speed of the first rotational assembly 26 (e.g., a relatively low engine power condition) and may be closed at a relatively high rotational speed of the first rotational assembly 26 (e.g., a relatively high engine power condition). While the bleed-off valve 46 of FIG. 1 is a pneumatically actuated valve, it should be understood that the present disclosure is not limited to pneumatically-actuated bleed-off valves and may also apply to bleed-off valves using other actuation systems such as, but not limited to, hydraulic actuation systems, electro-mechanical actuation systems, and the like.

The bleed-off valve 46 may be a piloted valve. The gas turbine engine 10 of FIG. 1, for example, includes the pilot valve 48 fluidly coupled to the pneumatic actuator 60. The pilot valve 48 is configured to control a flow of pressurized gas (e.g., bleed gas) to the pneumatic actuator 60 to control the position of the bleed-off valve 46. The pilot valve 48 may be configured as, for example, a solenoid valve. The pilot valve 48 may be controlled using an electrical signal provided by a controller 62. The controller 62 may be configured to determine whether operating conditions of the gas turbine engine 10 satisfy criteria for releasing core gases from the core flow path 24 via the bleed-off valve 46, for example, based on signals from one or more sensors (e.g., pressure sensors, temperature sensors, etc.). The controller 62 of FIG. 1 includes a first pressure sensor 64 in the compressor section 16 (e.g., an intermediate stage of the first compressor 38) to measure a pressure of the core gas within the core flow path 24. The controller 62 of FIG. 1 further includes a second pressure sensor 66 at the outlet 56 of the bleed-off valve 46 to measure a bleed-off valve outlet pressure.

The controller 62 may include any type of computing device, computational circuit, processor(s), CPU, computer, or the like capable of executing a series of instructions that are stored in memory. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The controller 62 may include a single memory device or a plurality of memory devices (e.g., a computer-readable storage device that can be read, written, or otherwise accessed by a general purpose or special purpose computing device), including any processing electronics and/or processing circuitry capable of executing instructions. The present disclosure is not limited to any particular type of memory device, which may be non-transitory, and which may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) maybe directly or indirectly coupled to the controller 62. The controller 62 may include, or may be in communication with, an input device that enables a user to enter data and/or instructions, and may include, or be in communication with, an output device configured, for example to display information (e.g., a visual display or a printer), or to transfer data, etc. Communications between the controller 62 and the pilot valve 48, the first sensor 64, and the second sensor 66, for example, may be via a hardwire connection or via a wireless connection. A person of skill in the art will recognize that portions of the controller 62 may assume various forms (e.g., digital signal processor, analog device, etc.) capable of performing the functions described herein.

Pressurized gas used for operation of the bleed-off valve 46 may be sourced from one or more locations within the gas turbine engine 10. The gas turbine engine 10 of FIG. 1, for example, includes a portion of the intake device 50 positioned within the cavity 52. The cavity 52 of FIG. 1 is formed, in part, by an engine case 68, which engine case 68 may form a portion of the engine static structure 30. The engine case 68 surrounds the cavity 52. The cavity 52 of FIG. 1 includes a portion of the core flow path 24 between the first compressor 38 and the combustor 32. However, the intake device 50 of the present disclosure is not limited to use with the particular cavity 52 of FIG. 1 or with the core flow path 24. Pressurized gas received by the intake device 50 may be supplied to the pneumatic actuator 60 for operation of the bleed-off valve 46. The cavity 52 of FIG. 1 may be located downstream of a highest-pressure compressor stage of the compressor section 16 along the core flow path 24. The pressurized gas from the cavity 52 may provide relatively high-pressure gases suitable for effecting operation (e.g., movement) of the bleed-off valve 46.

As discussed above, the bleed-off valve 46 may be opened at a relatively low rotational speed of the first rotational assembly 26 (e.g., a relatively low engine power condition) and may be closed at a relatively high rotational speed of the first rotational assembly 26 (e.g., a relatively high engine power condition). For example, the bleed-off valve 46 may be configured such that the bleed-off valve moves to the closed position at a predetermined closing point. The closing point may represent a value or values of one or more operational parameters of the gas turbine engine 10 at which, when reached, the bleed-off valve 46 is configured to be in the closed position. For example, the closing point of the bleed-off valve 46 may correspond to a particular engine speed (e.g., 99 percent of rated engine speed). The present disclosure, however, is not limited to a closing point corresponding to engine speed, and other gas turbine engine parameters may additionally or alternatively be used.

The performance of a bleed-off valve, such as the bleed-off valve 46, in closing at or approximately at the predetermined closing point during operation of a gas turbine engine, such as the gas turbine engine 10, may have a substantial impact on the efficient operation of the gas turbine engine. A maintenance procedure may be performed to operationally check (e.g., verify) the closing point for the bleed-off valve by determining that the bleed-off valve closes at a predetermined nominal closing point value (e.g., a closing point target) or within a predetermined tolerance of the nominal closing point value. For example, a maintenance procedure may include increasing an engine power (e.g., as represented by an engine speed) of a gas turbine engine until the bleed-off valve closes. Closure of the bleed-off valve may be indicated, for example, by a bleed-off valve outlet pressure (e.g., as measured by the second pressure sensor 66) of approximately zero (0) PSIG. The gas turbine engine parameter (e.g., engine speed) associated with the closing point of the bleed-off valve may be recorded when the bleed-off valve closes and may then be compared to the nominal closing point value or the nominal closing point value threshold to verify that the closing point of the bleed-off valve is acceptable (e.g., within specifications) for the particular gas turbine engine.

Figure 2:
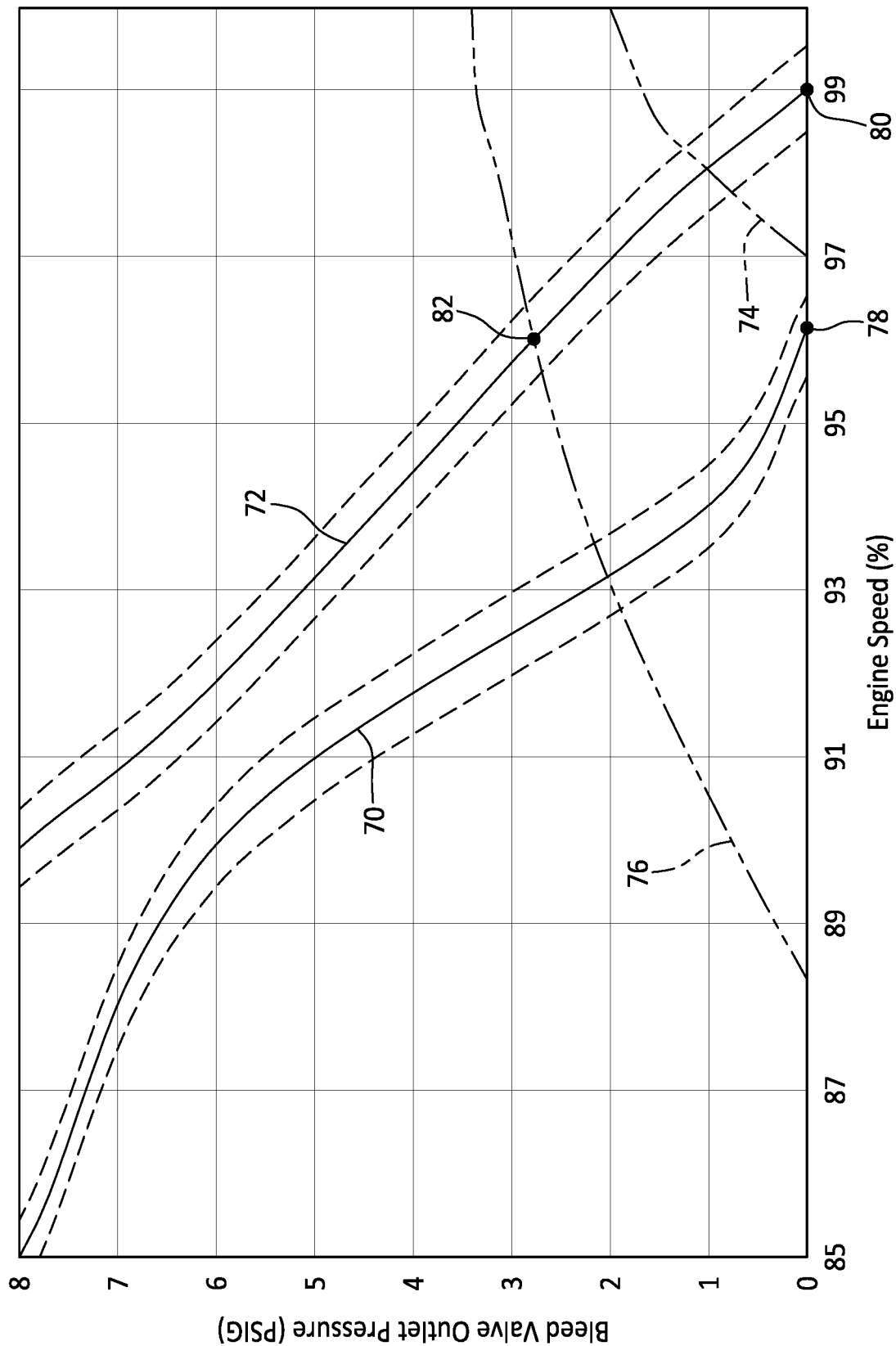
FIG. 2 illustrates an exemplary modulation characteristic curves for a bleed-off valve, in accordance with one or more embodiments of the present disclosure.

Referring to FIGS. 1 and 2, it may be desirable to perform (e.g., periodically) the closing point check for a bleed-off valve with the associated gas turbine engine installed on an aircraft and with the aircraft located on the ground. In this condition, the closing point of the bleed-off valve can be checked, adjusted if necessary, and then re-checked to verify proper operation of the bleed-off valve. However, for at least some gas turbine engine models, performance of a bleed-off valve closing point check may be difficult with the associated aircraft on the ground, because maintenance and operational limits on the gas turbine engine operation may prevent the gas turbine engine from reaching the relatively high power level associated with the bleed-off valve closing point.

FIG. 2 illustrates exemplary modulation characteristic curves for the bleed-off valve 46 of FIG. 1. The modulation characteristic curves illustrate the expected performance of the bleed-off valve 46 over a range of an engine condition (e.g., an ascertainable engine parameter such as engine speed). The modulation characteristic curves, as well as the closing point, for the bleed-off valve 46 may be influenced by one or more ambient conditions in which the gas turbine engine 10 is present such as, but not limited to, altitude, gas turbine engine inlet air temperature, air pressure, etc. FIG. 2 includes a first modulation characteristic curve 70 for the bleed-off valve 46 and a second modulation characteristic curve 72 for the bleed-off valve 46. The first modulation characteristic curve 70 and the second modulation characteristic curve 72 represent the expected operation of the bleed-off valve 46 at different ambient conditions. The first modulation characteristic curve 70 represents the expected operation of the bleed-off valve 46 with the gas turbine engine 10 and associated aircraft in an airborne condition. The second modulation characteristic curve 72 represents the expected operation of the bleed-off valve 46 with the gas turbine engine 10 and associated aircraft in a grounded condition. Each of the first modulation characteristic curve 70 and the second modulation characteristic curve 72 includes a tolerance range illustrated in dashed lines, which tolerance range indicates the range of acceptable bleed-off valve 46 operation.

FIG. 2 includes exemplary operational limits for the gas turbine engine 10. FIG. 2 includes a first operational limit 74 for the gas turbine engine 10 operating under the ambient conditions associated with the first modulation characteristic curve 70. FIG. 2 also includes a second operational limit 76 for the gas turbine engine 10 operating under the ambient conditions associated with the second modulation characteristic curve 72. In general, the gas turbine engine 10 may not be operated outside of (e.g., below and to the right) a relevant operational limit. The first modulation characteristic curve 70 includes a first closing point 78 at which the bleed-off valve 46 is expected to be in the closed position under the ambient conditions associated with the first modulation characteristic curve 70. The second modulation characteristic curve 72 includes a second closing point 80 at which the bleed-off valve 46 is expected to be in the closed position under the ambient conditions associated with the second modulation characteristic curve 72. As can be understood from FIG. 2, the gas turbine engine 10 may be operated to reach the first closing point 78 of the bleed-off valve 46 when operating under the ambient conditions associated with the first modulation characteristic curve 70. However, the gas turbine engine 10 may not be operated to reach the second closing point 80 of the bleed-off valve 46 when operating under the ambient conditions associated with the second modulation characteristic curve 72. In the case of the second modulation characteristic curve 72, the gas turbine engine 10 may be limited to achieving a maximum bleed-off valve closure point 82 corresponding to the second operational limit 76. At this maximum bleed-off valve closure point 82, the bleed-off valve 46 is expected to be in an open or partially-open position.

Figure 3:
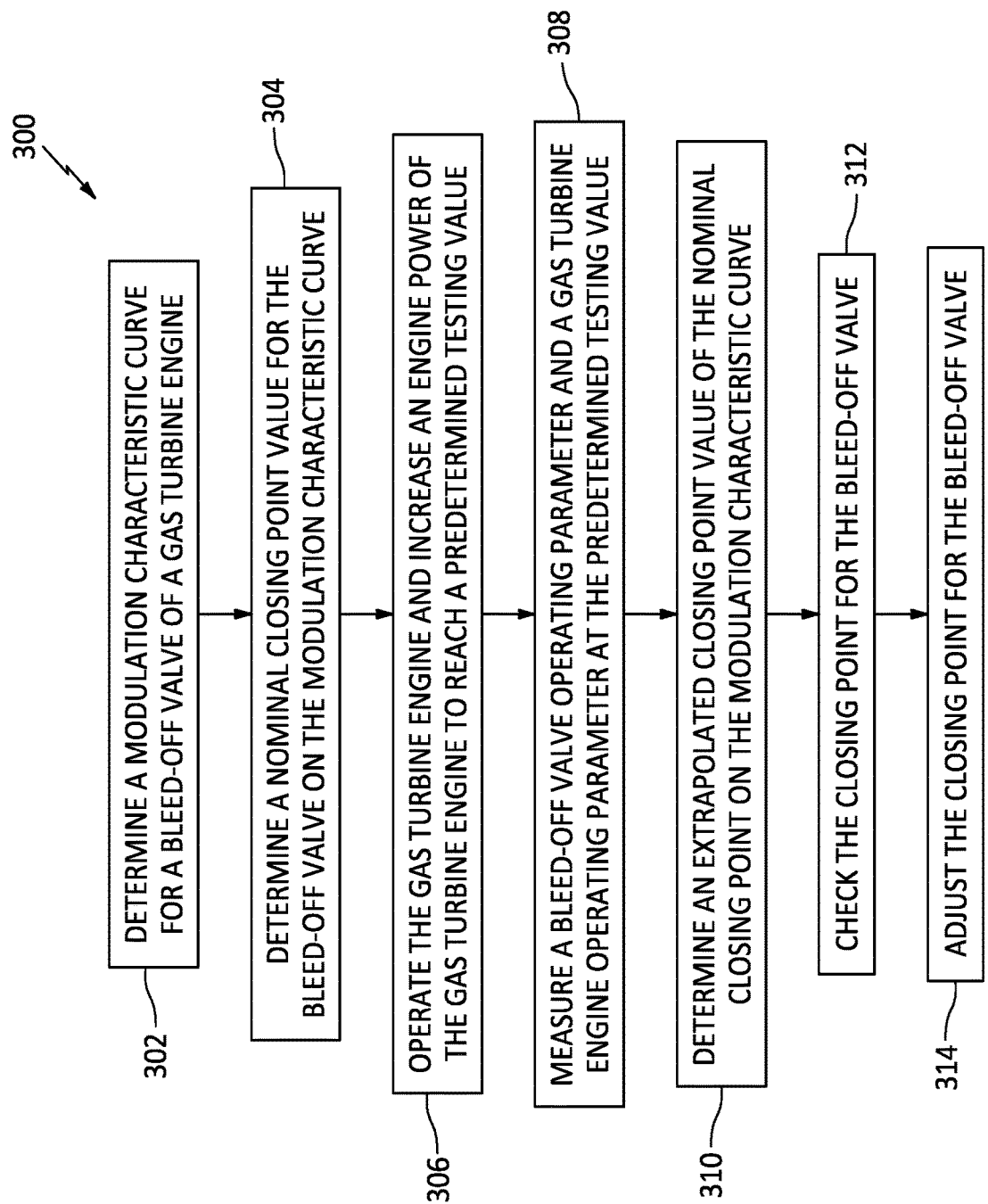
FIG. 3 illustrates a flowchart of a method for checking a closing point for a bleed-off valve for a gas turbine engine, in accordance with one or more embodiments of the present disclosure.

Referring to FIG. 1-3, a method 300 for checking a closing point for a bleed-off valve for a gas turbine engine is provided. FIG. 3 illustrates a flowchart of the method 300. The method 300 is described herein with respect to the gas turbine engine 10 and bleed-off valve 46 of FIG. 1, however, the method 300 of the present disclosure is not limited to use with the particular gas turbine engine 10 and bleed-off valve 46 illustrated in FIG. 1 and described above. Unless otherwise noted herein, it should be understood that the steps of method 300 are not required to be performed in the specific sequence in which they are discussed below and, in various embodiments, the steps of method 800 may be performed separately or simultaneously.

In Step 302, the modulation characteristic curve (e.g., the second modulation characteristic curve 72) for the bleed-off valve 46 is determined. The modulation characteristic curve may be determined based on the particular bleed-off valve 46 and gas turbine engine 10 as well as the ambient conditions for the gas turbine engine 10. Step 302 may include measuring or otherwise obtaining ambient condition parameter values such as, but not limited to, altitude, gas turbine engine inlet air temperature, air pressure, etc. Based on the ambient condition parameter values, the modulation characteristic curve may be calculated or otherwise obtained (e.g., using a look-up table for the particular bleed-off valve 46 model). The modulation characteristic curve is a function of a first parameter and a second parameter. For example, the first parameter may be one of a bleed-off valve parameter or a gas turbine engine parameter and the second parameter may be the other of the bleed-off valve parameter or the gas turbine engine parameter. Examples of bleed-off valve parameters include, but are not limited to, bleed-off valve outlet pressure, bleed-off valve outlet temperature, bleed-off valve position indication, etc. Examples of gas turbine engine parameters include, but are not limited to, engine speed, spool speed, engine power, shaft torque, pressure ratio (e.g., PX/P1), fuel flow, etc. The second modulation characteristic curve 72 of FIG. 2 is a function of engine speed as a percentage of rated engine speed (e.g., a gas turbine engine parameter) along the X-axis and bleed-off valve outlet pressure (e.g., a bleed-off valve parameter) along the Y-axis. However, the present disclosure is not limited to the particular parameters of FIG. 2 for characterizing the modulation characteristic curve. Step 302 may further include determining an operational limit (e.g., the second operational limit 76) for the particular gas turbine engine 10 as well as the ambient conditions for the gas turbine engine 10.

In Step 304, a nominal closing point value (e.g., the second closing point 80) for the bleed-off valve 46 may be determined. The nominal closing point value represents a value on the determined modulation characteristic curve corresponding to an expected positioning of the bleed-off valve to the closed position. The nominal closing point value may be expressed as one of the first parameter or the second parameter for the determined modulation characteristic curve. For example, the nominal closing point value for the bleed-off valve 46 operating under the ambient conditions associated with the first modulation characteristic curve 70 of FIG. 2 is approximately 96 percent of rated engine speed. For further example, the nominal closing point value for the bleed-off valve 46 operating under the ambient conditions associated with the second modulation characteristic curve 72 of FIG. 2 is approximately 99 percent of rated engine speed. The nominal closing point value may be determined based on the particular bleed-off valve 46 and gas turbine engine 10 as well as the ambient conditions for the gas turbine engine 10 associated with the modulation characteristic curve determined in Step 302. Similar to the modulation characteristic curve, the nominal closing point value may be calculated or otherwise obtained (e.g., using a look-up table for the particular bleed-off valve 46 model). As shown in FIG. 2, the nominal closing point value (e.g., the second closing point 80) may be located outside of an operational limit (e.g., the second operational limit 76) for the conditions associated with the determined modulation characteristic curve.

In Step 306, the gas turbine engine 10 is operated, at or approximately at the ambient conditions determined in Step 302, to effect operation of the bleed-off valve 46. Step 306 includes increasing an engine power of the gas turbine engine 10 until one of the first parameter or the second parameter reaches a predetermined testing value. For example, the engine power may be increased until the gas turbine engine parameter (e.g., engine speed) reaches a predetermined testing value. As will be discussed in further detail, the predetermined testing value may be any value (e.g., any value of the first parameter and/or the second parameter) along the modulation characteristic curve which is not outside of a relevant operational limit for the ambient conditions, maintenance conditions, or other limiting operational conditions in which the gas turbine engine 10 is operating. For example, the maximum bleed-off valve closure point 82 of FIG. 2 may correlate to a predetermined testing value of approximately 96 percent of rated engine speed. The term "engine power," as used herein, may be quantified, for example, by an engine speed, a spool speed, a power, a shaft torque, a pressure ratio (e.g., PX/P1), a fuel flow, etc. and the present disclosure is not limited to any particular gas turbine engine parameter for quantifying the engine power.

In Step 308, a first measured value of the first parameter and a second measured value of the second parameter are determined (e.g., measured and/or recorded) with the gas turbine engine 10 operating and with the first parameter and/or the second parameter at or substantially at the predetermined testing value. For example, the bleed-off valve outlet pressure (e.g., a value of the bleed-off valve parameter) and the engine speed (e.g., a value of the gas turbine engine parameter) may be measured and recorded when the engine speed reaches the predetermined testing value, which predetermined testing value is a value of the engine speed. With the gas turbine engine 10 operating at the predetermined testing value, the bleed-off valve 46 may be in an open or partially-open position.

In Step 310, an extrapolated closing point value of the nominal closing point value is determined. The extrapolated closing point value is a value of the first parameter (e.g., a bleed-off valve parameter) or the second parameter (e.g., a gas turbine engine parameter) on the modulation characteristic curve. The extrapolated closing point value is a value of the first parameter or the second parameter which corresponds to a point on the modulation characteristic curve identified by the second measured value of the second parameter or the first measured value of the first parameter, respectively. Using the second modulation characteristic curve 72 of FIG. 2, for example, the extrapolated closing point value may be a value of the gas turbine engine parameter (e.g., engine speed) on the second modulation characteristic curve 72 which intersects the bleed-off valve parameter (e.g., bleed-off valve outlet pressure) measured value determined in Step 308. Alternatively, for example, the extrapolated closing point value may be a value of the bleed-off valve parameter (e.g., bleed-off valve outlet pressure) on the second modulation characteristic curve 72 which intersects the gas turbine engine parameter (e.g., engine speed) measured value determined in Step 308.

In Step 312, the closing point for the bleed-off valve 46 is checked by comparing one of the first measured value or the second measured value to the extrapolated closing point value. In other words, the closing point for the bleed-off valve 46 may checked (e.g., indirectly checked) according to the present disclosure without the first measured value or the second measured value reaching the nominal closing point value for the bleed-off valve 46. For example, where the determined extrapolated closing point value of Step 310 is a value of the gas turbine engine parameter (e.g., engine speed), the measured gas turbine engine value of Step 308 may be compared to the extrapolated closing point value. Alternatively, for example, where the determined extrapolated closing point value of Step 310 is a value of the bleed-off valve parameter (e.g., bleed-off valve outlet pressure), the measured bleed-off valve value of Step 308 may be compared to the extrapolated closing point value. Step 312 may include applying a predetermined tolerance range to the extrapolated closing point value. For example, the tolerance range may be equal to the extrapolated closing point value+/−five percent of the extrapolated closing point value. For further example, the tolerance range may be equal to the extrapolated closing point value+/−two percent of the extrapolated closing point value. For further example, the tolerance range may be equal to the extrapolated closing point value+/−one percent of the extrapolated closing point value. The present disclosure, however, is not limited to any particular values for the tolerance range. The first measured value or the second measured value, as applicable, may be compared to the tolerance range of the extrapolated closing point value. If the respective measured value is within the tolerance range, the closing point for the bleed-off valve 46 is likely to be acceptable for normal operation of the gas turbine engine 10.

In Step 314, if the respective measured value is not within the tolerance range, the closing point for the bleed-off valve 46 may require adjustment or the bleed-off valve 46 may require corrective maintenance. In some cases, sufficient adjustment of the bleed-off valve 46 may not be possible and the bleed-off valve 46 may require replacement. Once the closing point of the bleed-off valve 46 has been adjusted, the closing point may be rechecked using one or more steps of the method 300.

Figure 4:
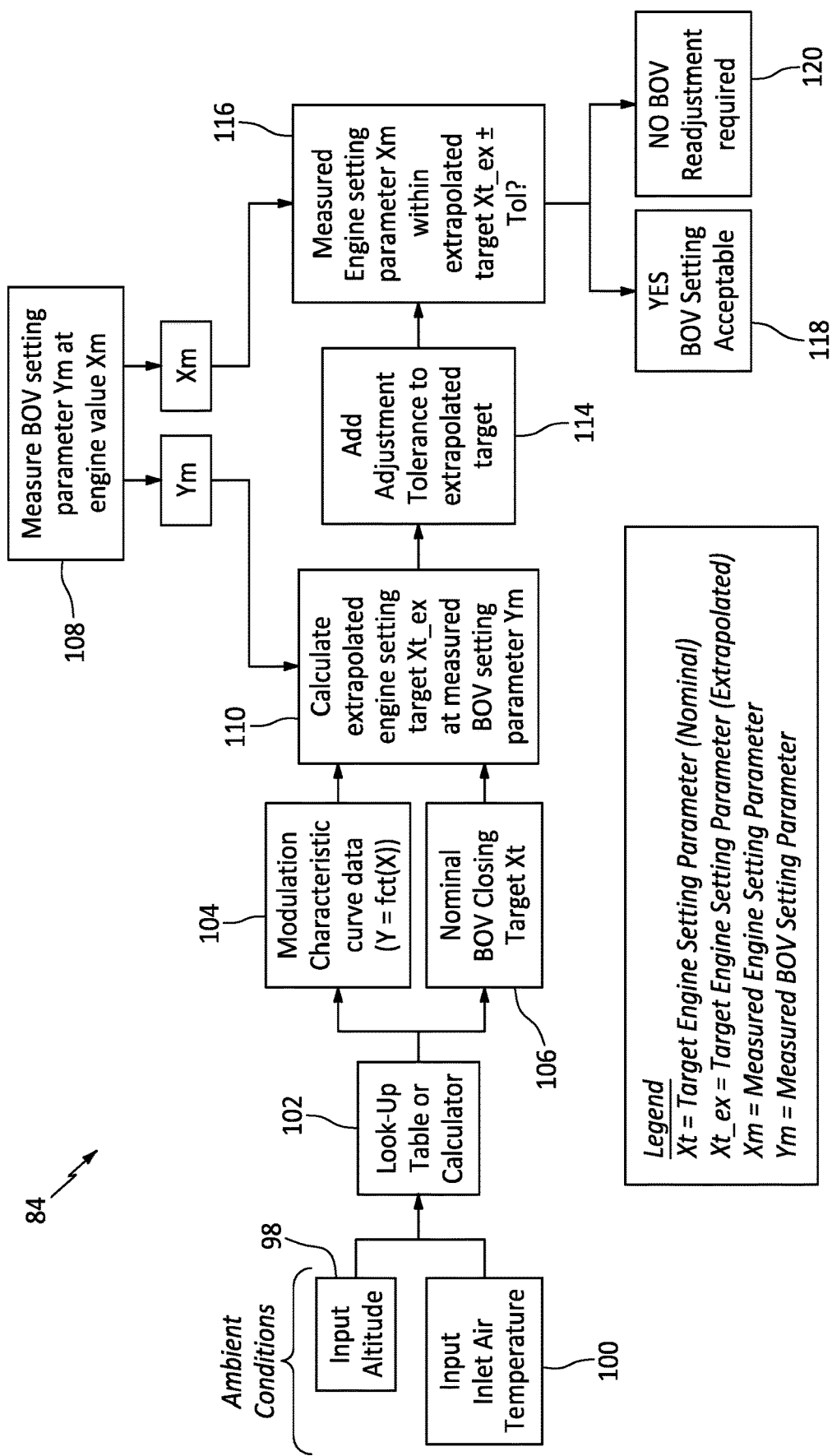
FIG. 4 illustrates a flowchart for an exemplary application of the method of FIG. 3, in accordance with one or more embodiments of the present disclosure.
Figure 5:
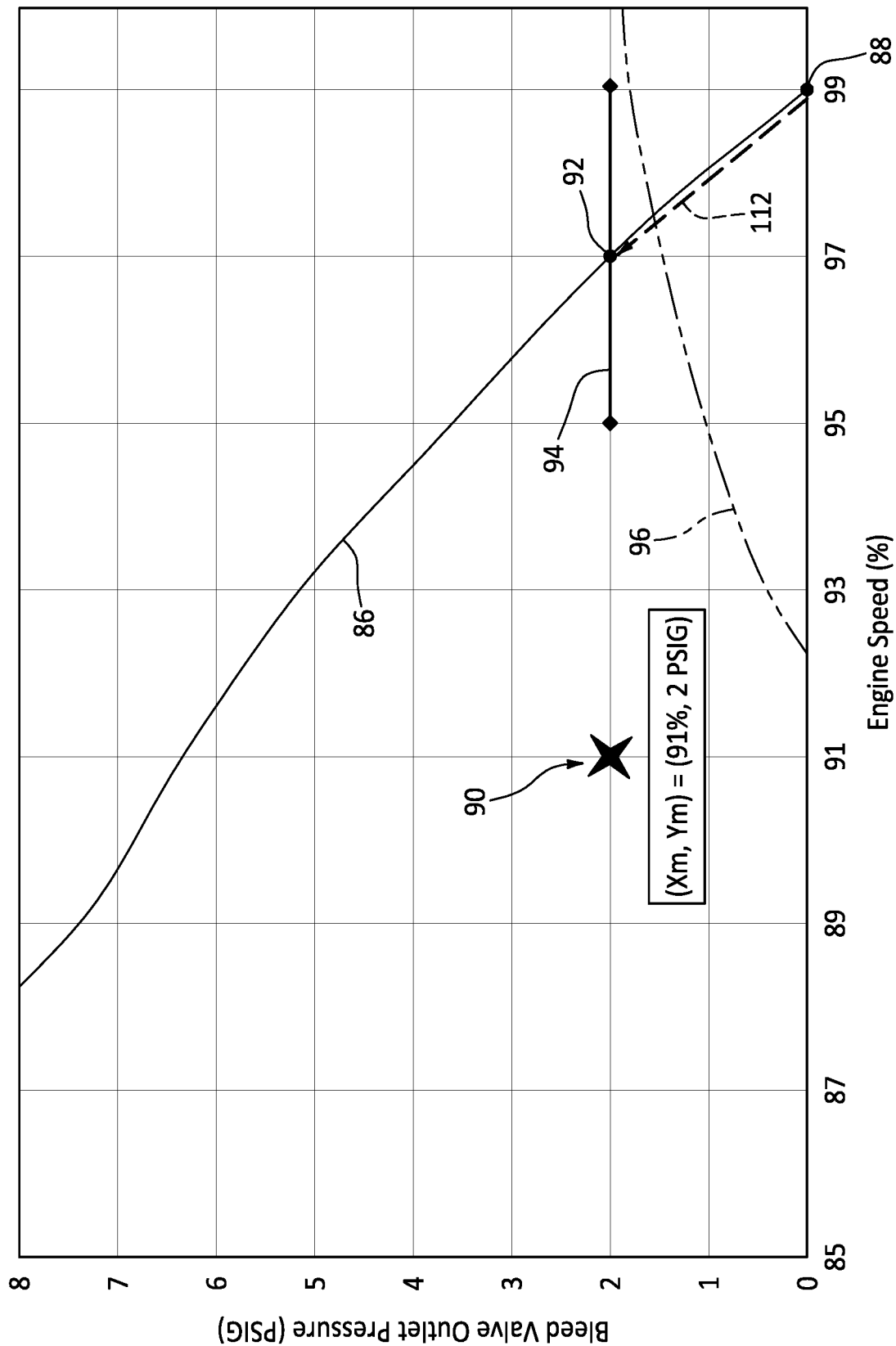
FIG. 5 illustrates a modulation characteristic curve for the exemplary application of FIG. 4, in accordance with one or more embodiments of the present disclosure.

Referring to FIGS. 1 and 3-5, a first exemplary application of the method 300 is illustrated in the flowchart 84 of FIG. 4. FIG. 5 illustrates a modulation characteristic curve 86, a nominal closing point value 88, a predetermined testing value 90, an extrapolated closing point value 92, a tolerance range 94, and an operational limit 96 for the gas turbine engine 10. The modulation characteristic curve 86 is a function of engine speed (X-axis) and bleed-off valve outlet pressure (Y-axis). Ambient conditions for the gas turbine engine 10, such as altitude (flowchart block 98) and inlet air temperature (flowchart block 100) are measured or otherwise obtained. The ambient conditions are applied (e.g., using a look-up table, calculator, computer system, etc.; flowchart block 102) to determine the modulation characteristic curve 86 (flowchart block 104) and the nominal closing point value 88 (flowchart block 106) for the bleed-off valve 46. The nominal closing point value 88 is a value $X_t$ of the engine speed on the modulation characteristic curve 86. In addition to the modulation characteristic curve 86 and the nominal closing point value 88, the operational limit 96 may be determined for the gas turbine engine 10 based on the ambient conditions. The gas turbine engine 10 is operated and a value $Y_m$ of the bleed-off valve outlet pressure and a value $X_m$ of the engine speed are measured and/or recorded at the predetermined testing value 90 which is the value $X_m$ of the engine speed (flowchart block 108). The modulation characteristic curve 86, the measured value $Y_m$, and the nominal closing point value 88 are used to determine the extrapolated closing point value 92 (flowchart block 110). The extrapolated closing point value 92 is a value $X_{t\_ex}$ of the engine speed on the modulation characteristic curve 86 which intersects the measured value $Y_m$. Extrapolation along the modulation characteristic curve 86 from the nominal closing point value 88 to the extrapolated closing point value 92 is illustrated by dashed line 112. The tolerance range 94 is applied to the value $X_{t\_ex}$ of the extrapolated closing point value 92 (flowchart block 114). The measured value $X_m$ of the engine speed is compared to the tolerance range 94 (flowchart block 116). If the measured value $X_m$ of the engine speed is within the tolerance range 94, the closing point for the bleed-off valve 46 is acceptable (flowchart block 118). As shown in FIG. 5, however, the measured value Xm of the engine speed is outside of the tolerance range 94 and the closing point for the bleed-off valve 46 is not acceptable (flowchart block 120). Accordingly, adjustment and re-checking of the bleed-off valve 46 closing point may be subsequently performed.

Figure 6:
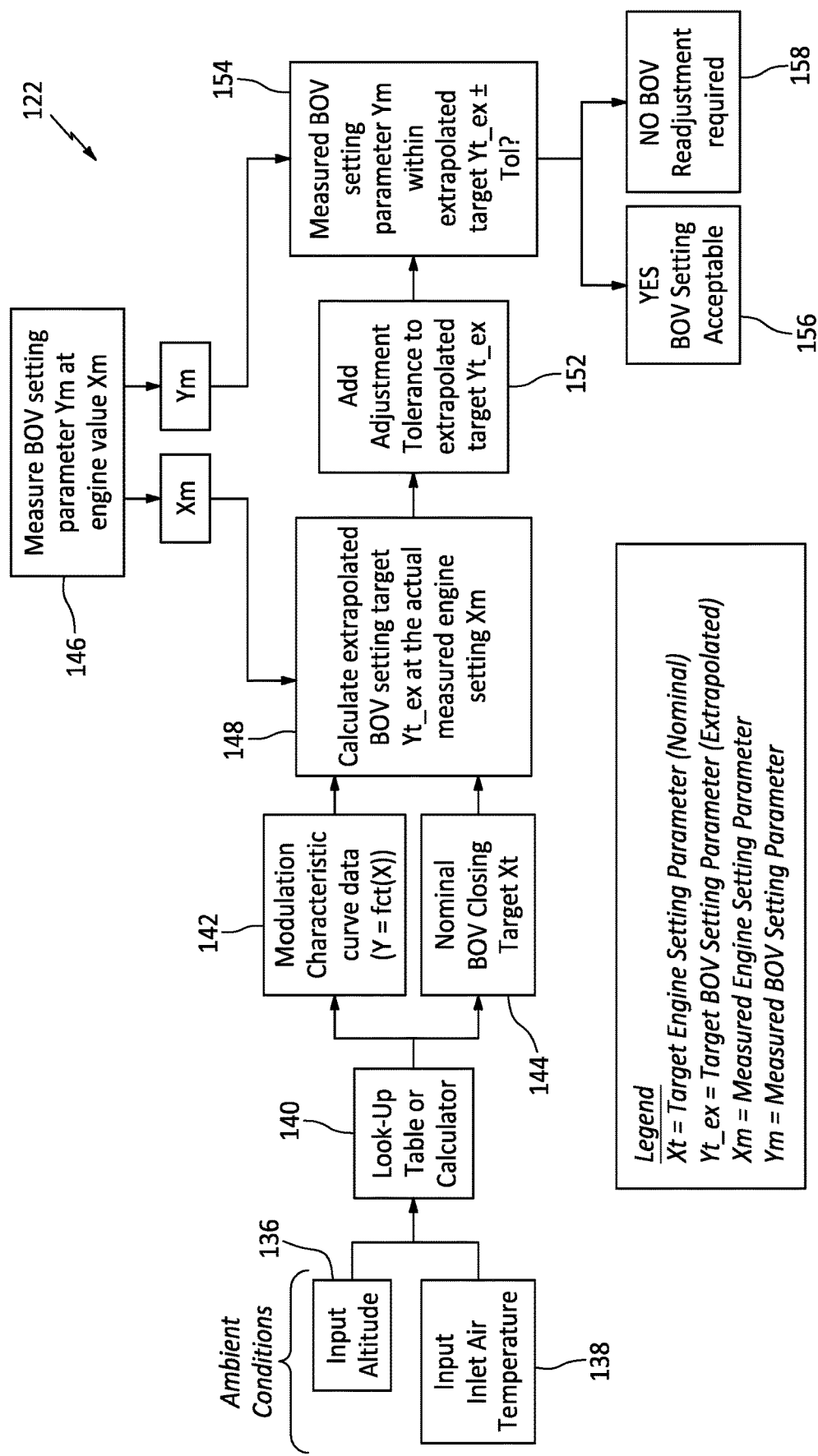
FIG. 6 illustrates a flowchart for an exemplary application of the method of FIG. 3, in accordance with one or more embodiments of the present disclosure.
Figure 7:
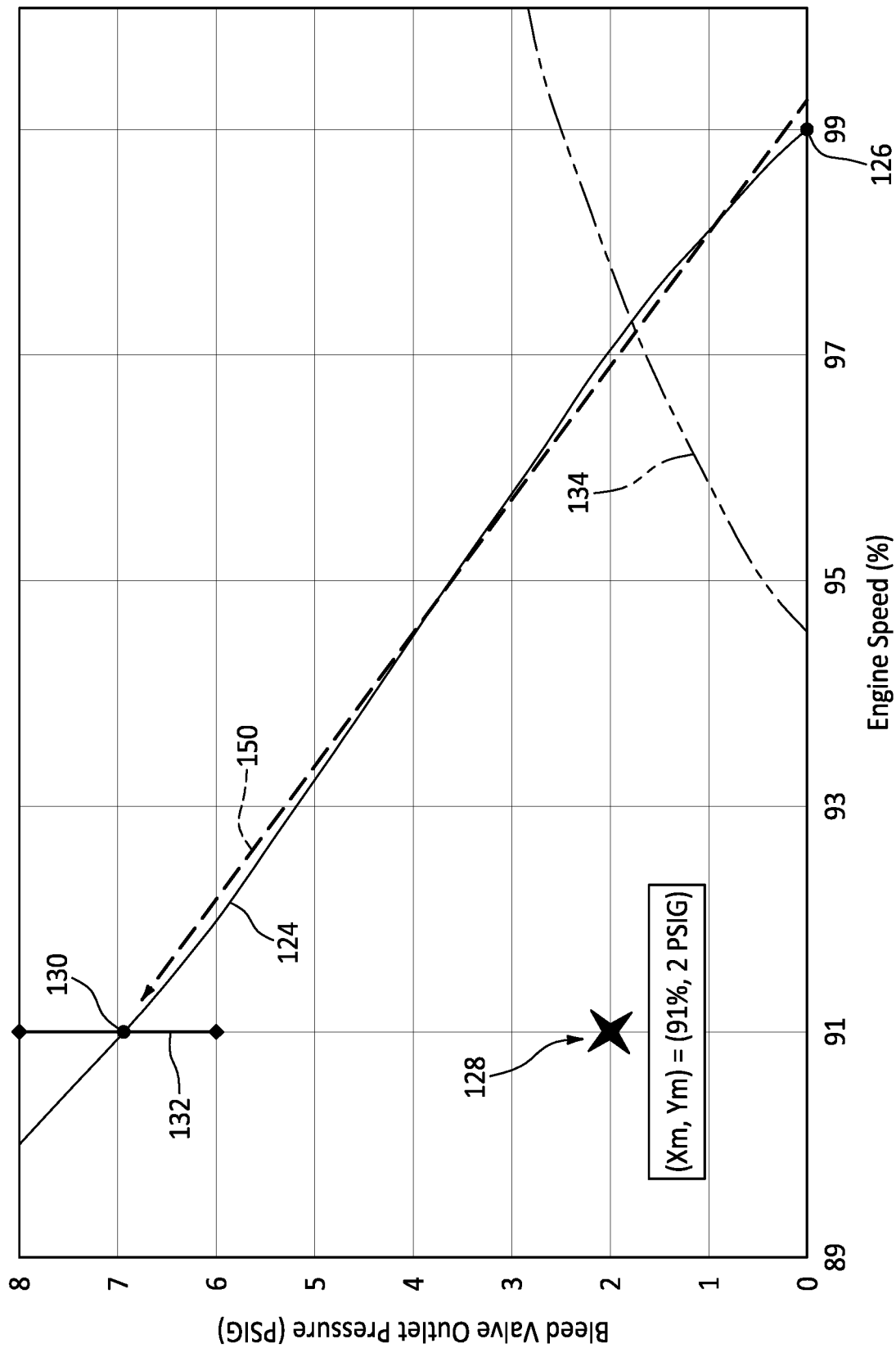
FIG. 7 illustrates a modulation characteristic curve for the exemplary application of FIG. 6, in accordance with one or more embodiments of the present disclosure.

Referring to FIGS. 1, 3, 6, and 7, a second exemplary application of the method 300 is illustrated in the flowchart 122 of FIG. 6. FIG. 7 illustrates a modulation characteristic curve 124, a nominal closing point value 126, a predetermined testing value 128, an extrapolated closing point value 130, a tolerance range 132, and an operational limit 134 for the gas turbine engine 10. The modulation characteristic curve 124 is a function of engine speed (X-axis) and bleed-off valve outlet pressure (Y-axis). Ambient conditions for the gas turbine engine 10, such as altitude (flowchart block 136) and inlet air temperature (flowchart block 138) are measured or otherwise obtained. The ambient conditions are applied (e.g., using a look-up table, calculator, computer system, etc.; flowchart block 140) to determine the modulation characteristic curve 124 (flowchart block 142) and the nominal closing point value 126 (flowchart block 144) for the bleed-off valve 46. The nominal closing point value 126 is a value Xt of the engine speed on the modulation characteristic curve 124. In addition to the modulation characteristic curve 124 and the nominal closing point value 126, the operational limit 134 may be determined for the gas turbine engine 10 based on the ambient conditions. The gas turbine engine 10 is operated and a value Ym of the bleed-off valve outlet pressure and a value Xm of the engine speed are measured and/or recorded at the predetermined testing value 128 which is the value Xm of the engine speed (flowchart block 146). The modulation characteristic curve 124, the measured value Xm, and the nominal closing point value 126 are used to determine the extrapolated closing point value 130 (flowchart block 148). The extrapolated closing point value 130 is a value Yt_ex of the bleed-off valve outlet pressure on the modulation characteristic curve 124 which intersects the measured value Xm. Extrapolation along the modulation characteristic curve 124 from the nominal closing point value 126 to the extrapolated closing point value 130 is illustrated by dashed line 150. The tolerance range 132 is applied to the value Yt_ex of the extrapolated closing point value 130 (flowchart block 152). The measured value Ym of the bleed-off valve outlet pressure is compared to the tolerance range 132 (flowchart block 154). If the measured value Ym of the bleed-off valve outlet pressure is within the tolerance range 132, the closing point for the bleed-off valve 46 is acceptable (flowchart block 156). As shown in FIG. 7, however, the measured value Ym of the bleed-off valve outlet pressure is outside of the tolerance range 132 and the closing point for the bleed-off valve 46 is not acceptable (flowchart block 158). Accordingly, adjustment and re-checking of the bleed-off valve 46 closing point may be subsequently performed.

Figure 8:
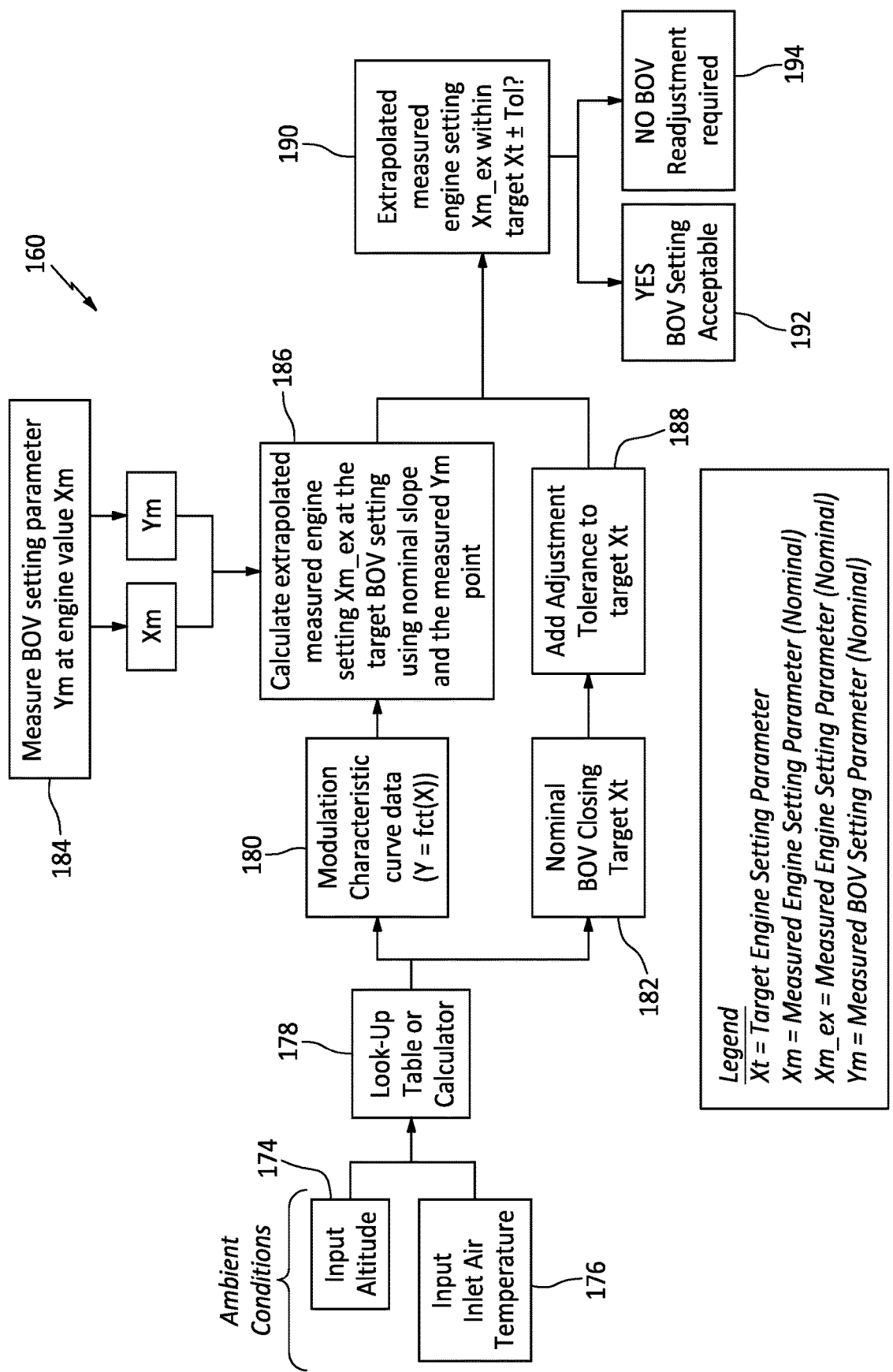
FIG. 8 illustrates a flowchart for an exemplary application of the method of FIG. 3, in accordance with one or more embodiments of the present disclosure.
Figure 9:
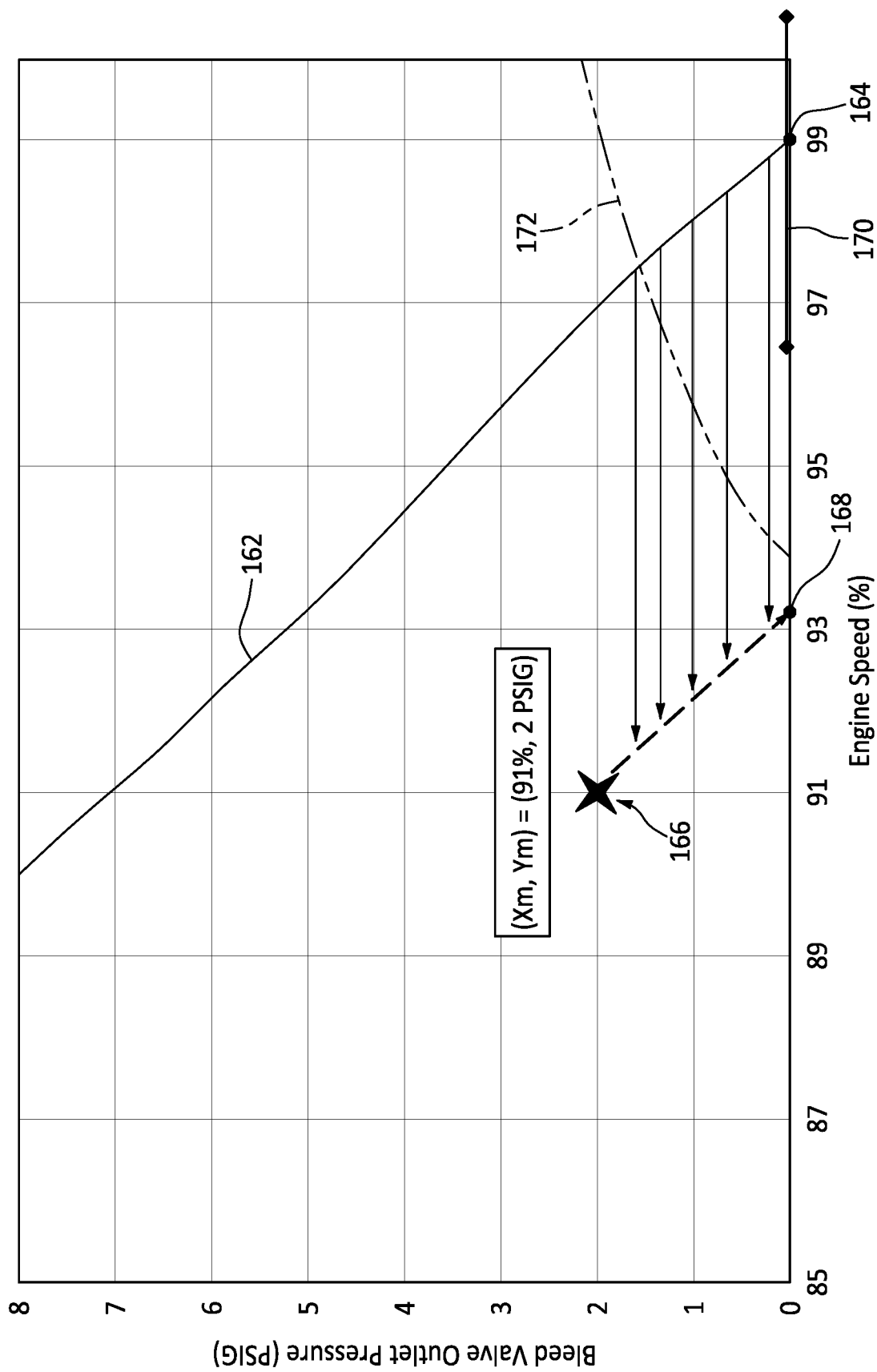
FIG. 9 illustrates a modulation characteristic curve for the exemplary application of FIG. 8, in accordance with one or more embodiments of the present disclosure.

Referring to FIGS. 1, 3, 8, and 9, a third exemplary application of the method 300 is illustrated in the flowchart 160 of FIG. 8. FIG. 9 illustrates a modulation characteristic curve 162, a nominal closing point value 164, a predetermined testing value 166, an extrapolated closing point value 168, a tolerance range 170, and an operational limit 172 for the gas turbine engine 10. The modulation characteristic curve 162 is a function of engine speed (X-axis) and bleed-off valve outlet pressure (Y-axis). Ambient conditions for the gas turbine engine 10, such as altitude (flowchart block 174) and inlet air temperature (flowchart block 176) are measured or otherwise obtained. The ambient conditions are applied (e.g., using a look-up table, calculator, computer system, etc.; flowchart block 178) to determine the modulation characteristic curve 162 (flowchart block 180) and the nominal closing point value 164 (flowchart block 182) for the bleed-off valve 46. The nominal closing point value 164 is a value $X_t$ of the engine speed on the modulation characteristic curve 162. In addition to the modulation characteristic curve 162 and the nominal closing point value 164, the operational limit 172 may be determined for the gas turbine engine 10 based on the ambient conditions. The gas turbine engine 10 is operated and a value $Y_m$ of the bleed-off valve outlet pressure and a value $X_m$ of the engine speed are measured and/or recorded at the predetermined testing value 166 which is the value $X_m$ of the engine speed (flowchart block 184). A point corresponding to the measured value Xm and the measured value Ym is extrapolated to the extrapolated closing point value 168 using a slope (e.g., an average slope) of the modulation characteristic curve 162 (flowchart block 186). For example, the measured value Ym may be extrapolated to the extrapolated closing point value 168 using an average slope of the modulation characteristic curve 162 between the predetermined testing value 166 and the nominal closing point value 164. The extrapolated closing point value 168 is a value $X_{m\_ex}$ of the engine speed. The tolerance range 170 is applied to the value $X_t$ of the nominal closing point value 164 (flowchart block 188). The value $X_{m\_ex}$ of the engine speed is compared to the tolerance range 170 (flowchart block 190). If the value $X_{m\_ex}$ of the engine speed is within the tolerance range 170, the closing point for the bleed-off valve 46 is acceptable (flowchart block 192). As shown in FIG. 9, however, the value $X_{m\_ex}$ of the engine speed is outside of the tolerance range 170 and the closing point for the bleed-off valve 46 is not acceptable (flowchart block 194). Accordingly, adjustment and re-checking of the bleed-off valve 46 closing point may be subsequently performed.

Figure 10:
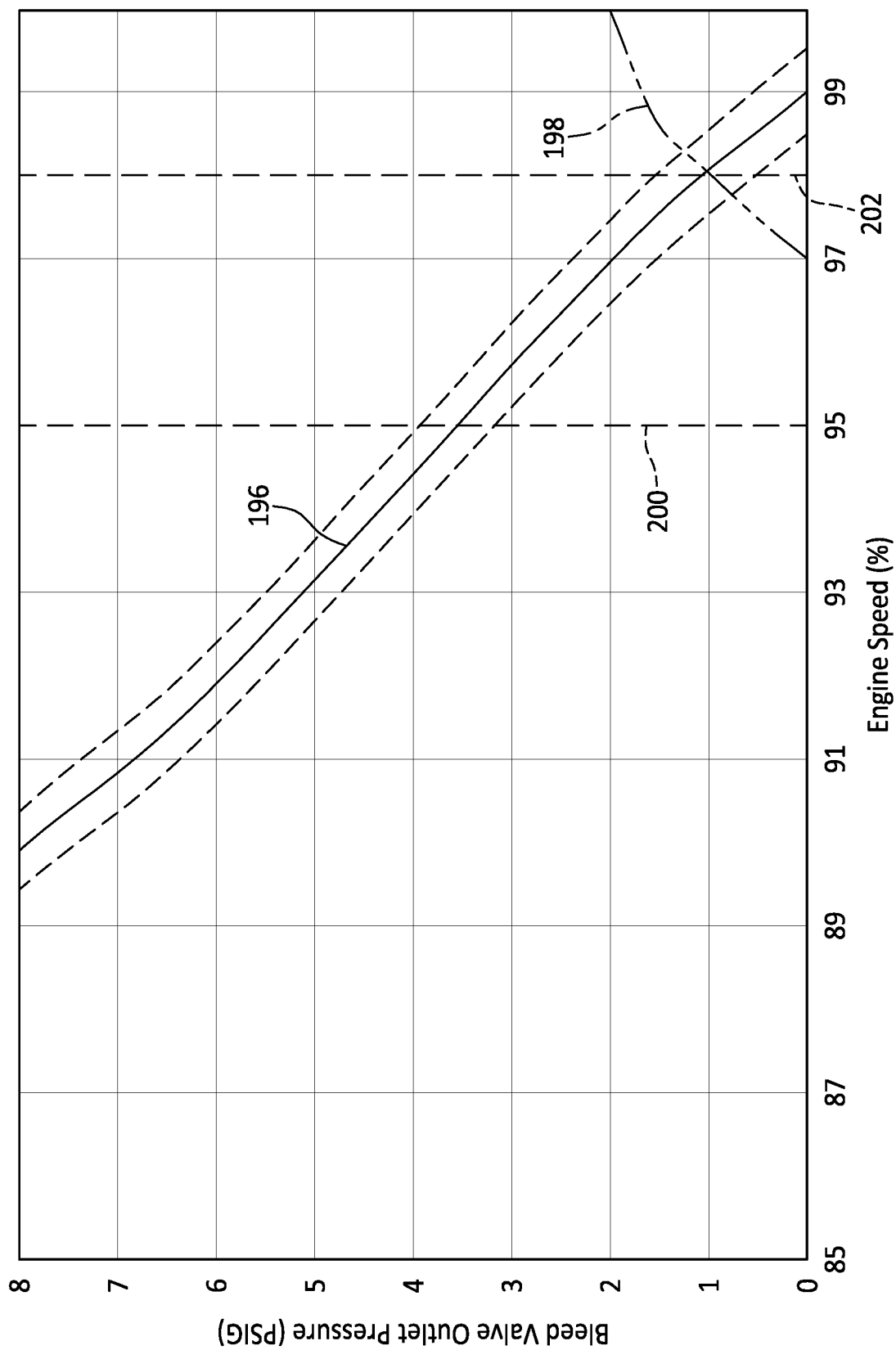
FIG. 10 illustrates an exemplary modulation characteristic curves for a bleed-off valve, in accordance with one or more embodiments of the present disclosure.

Referring to FIG. 10, an exemplary modulation characteristic curve 196 for the bleed-off valve 46 and an exemplary operational limit 198 for the gas turbine engine 10 are illustrated. FIG. 10 further illustrates a non-limiting predetermined testing value 200 and a limiting predetermined testing value 202. In some embodiments, the method 300 may include determining a non-limiting predetermined testing value such as the non-limiting predetermined testing value 200. The non-limiting predetermined testing value 200 may be a value of the gas turbine engine parameter (e.g., the engine speed, X-axis). The non-limiting predetermined testing value 200 may be selected for the particular bleed-off valve 46 and gas turbine engine 10 such that the non-limiting predetermined testing value 200 will not exceed an operational limit, such as the operational limit 198, for any anticipated ambient conditions in which the gas turbine engine 10 may be present during performance of the method 300. The non-limiting predetermined testing value 200 of FIG. 10 has a value of approximately 95% of rated engine speed, and so is sufficient far from the operational limit 198 that the steps of the method 300 may be performed without consideration for the operational limit 198. In other words, by selecting a conservative value for the predetermined testing value 200, determination of the relevant operational limit or limits for the gas turbine engine 10 may not be necessary for performance of the method 300.

In some embodiments, the method 300 may include determining a limiting predetermined testing value such as the limiting predetermined testing value 202. The limiting predetermined testing value 202 may be a value of the gas turbine engine parameter (e.g., the engine speed, X-axis). The limiting predetermined testing value 202 may be selected for the particular bleed-off valve 46 and gas turbine engine 10 such that the limiting predetermined testing value 202 may be reached during the performance of the method 300 (e.g., Step 306) at or proximate (e.g., just before) an operational limit for the gas turbine engine 10, such as the operational limit 198. The limiting predetermined testing value 202 of FIG. 10 has a value of approximately 98% of rated engine speed, and so performance of the method 300 may bring the bleed-off valve parameter and the gas turbine engine parameter in proximity to the operational limit 198 of the gas turbine engine 10. Selection of a limiting predetermined testing value, such as the limiting predetermined testing value 202, for the method 300 may provide a more accurate check of the bleed-off valve 46 closing point, due to a lesser degree of required extrapolation in comparison to the use of a non-limiting predetermined testing value, such as the non-limiting predetermined testing value 200. However, a limiting predetermined testing value may need to be recalculated after each adjustment of the bleed-off valve 46 closing point, after a substantial change in ambient conditions or maintenance conditions, or after any other change in conditions affecting the operation of the bleed-off valve 46 or the operational limit associated with the gas turbine engine 10. It should be understood, of course, that the present disclosure is not limited to the particular predetermined testing values 200, 202 illustrated in FIG. 10.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A method for checking a closing point for a bleed-off valve for a gas turbine engine, the method comprising:
   determining a modulation characteristic curve for the bleed-off valve, the modulation characteristic curve is a function of a bleed-off valve parameter and a gas turbine engine parameter;
   determining a nominal closing point value for the bleed-off valve on the modulation characteristic curve, the nominal closing point value is a value of the gas turbine engine parameter;
   operating the gas turbine engine and increasing an engine power of the gas turbine engine until the gas turbine engine parameter reaches a predetermined testing value;
   determining a bleed-off valve measured value of the bleed-off valve parameter and a gas turbine engine measured value of the gas turbine engine parameter when the gas turbine engine parameter reaches the predetermined testing value, the gas turbine engine measured value is different than the nominal closing point value;
   determining, using the modulation characteristic curve, an extrapolated closing point value of the gas turbine engine parameter based on the bleed-off valve measured value; and
   checking the closing point for the bleed-off valve by comparing the gas turbine engine measured value to the extrapolated closing point value, where the extrapolated closing point value is a value of the gas turbine engine parameter.

2. The method of claim 1, wherein the step of determining the modulation characteristic curve includes determining an altitude and an inlet air temperature for the gas turbine engine, the modulation characteristic curve based, at least in part, on the altitude and the inlet air temperature.

3. The method of claim 1, wherein the bleed-off valve parameter is a bleed-off valve outlet pressure.

4. The method of claim 1, wherein the gas turbine engine parameter is an engine speed of the gas turbine engine.

5. The method of claim 1, wherein the predetermined testing value is an engine operating limit for the gas turbine engine.

6. The method of claim 5, wherein the nominal closing point value is outside of the engine operating limit for the gas turbine engine.

7. The method of claim 1, wherein the predetermined testing value is a non-limiting value.

8. The method of claim 1, further comprising adjusting the closing point for the bleed-off valve if the gas turbine engine measured value is outside of a predetermined tolerance range of the extrapolated closing point value.

9. The method of claim 1, wherein
   the gas turbine engine includes a compressor section which defines a portion of a core flow path through the gas turbine engine;
   the bleed-off valve is in fluid communication with the core flow path within the compressor section via a pressure relief line; and
   the step of operating the gas turbine engine includes regulating a pressure of core gas within the compressor section by bleeding core gas from the core flow path with the bleed-off valve.

10. The method of claim 9, wherein the bleed-off valve is in fluid communication with the core flow path within an intermediate stage of a compressor of the compressor section.

11. A method for checking a closing point for a bleed-off valve for a gas turbine engine, the method comprising:
- determining a modulation characteristic curve for the bleed-off valve, the modulation characteristic curve is a function of a bleed-off valve outlet pressure of the bleed-off valve and an engine speed of the gas turbine engine;
- operating the gas turbine engine and increasing an engine power of the gas turbine engine until the engine speed reaches a predetermined testing value;
- determining a bleed-off valve measured value of the bleed-off valve outlet pressure and a gas turbine engine measured value of the engine speed when the engine speed reaches the predetermined testing value;
- determining an extrapolated closing point value of the engine speed based on the bleed-off valve outlet pressure, the extrapolated closing point value corresponds to the engine speed of the modulation characteristic curve at the bleed-off valve measured value of the bleed-off valve outlet pressure; and
- checking the closing point for the bleed-off valve by comparing the gas turbine engine measured value to a predetermined tolerance range of the extrapolated closing point value.

12. The method of claim 11, wherein the step of determining the modulation characteristic curve includes determining an altitude and an inlet air temperature for the gas turbine engine, the modulation characteristic curve based, at least in part, on the altitude and the inlet air temperature.

13. The method of claim 11, further comprising adjusting the closing point for the bleed-off valve if the gas turbine engine measured value is outside of the predetermined tolerance range of the extrapolated closing point value.

14. The method of claim 11, further comprising determining a nominal closing point value for the bleed-off valve on the modulation characteristic curve, the nominal closing point value is a value of the engine speed, the gas turbine engine measured value is less than the nominal closing point value.

* * * * *